(12) United States Patent
Lee

(10) Patent No.: US 6,169,582 B1
(45) Date of Patent: Jan. 2, 2001

(54) IMAGE SIGNAL PROCESSING SYSTEM WHICH USES PORTABLE COMPUTER MONITOR AS A DISPLAY

(75) Inventor: Chang-Seop Lee, Suwon (KR)

(73) Assignee: Samsung Electronics Co., Ltd., Suwon (KR)

( * ) Notice: Under 35 U.S.C. 154(b), the term of this patent shall be extended for 0 days.

(21) Appl. No.: 08/933,851

(22) Filed: Sep. 19, 1997

(30) Foreign Application Priority Data

Sep. 20, 1996 (KR) .................................................. 96-41161

(51) Int. Cl.$^7$ ................................. H04N 5/64; H04N 7/00
(52) U.S. Cl. ............................................. 348/552; 348/794
(58) Field of Search .................................... 348/552, 794, 348/554, 555; 361/681; H04N 5/64, 7/00

(56) References Cited

U.S. PATENT DOCUMENTS

| | | | |
|---|---|---|---|
| 4,646,158 | * | 2/1987 | Ohno et al. .......................... 348/794 |
| 4,652,932 | * | 3/1987 | Miyajima et al. .................... 348/794 |
| 4,663,670 | * | 5/1987 | Ito et al. ............................... 348/794 |
| 4,694,347 | * | 9/1987 | Ito ........................................ 348/794 |
| 4,809,078 | * | 2/1989 | Yabe et al. ........................... 348/794 |

* cited by examiner

Primary Examiner—Michael Lee
Assistant Examiner—Trang U. Tran
(74) Attorney, Agent, or Firm—Robert E. Bushnell, Esq.

(57) ABSTRACT

An image signal processing system uses a display removed from a portable computer, and includes a housing containing an image signal processing system for receiving and converting image signals to provide image signal data, wherein the housing is provided with a fixing member for fixing the display removed from the portable computer, and the image signal processing system is provided with a connector for electrically connecting the system to the display so as to transmit the image signal to the display.

14 Claims, 5 Drawing Sheets

IMAGE SIGNAL PROCESSING SYSTEM WHICH USES PORTABLE COMPUTER MONITOR AS A DISPLAY

CLAIM OF PRIORITY

This application makes reference to, incorporates the disclosure of, and claims all benefits accruing under 35 U.S.C. §119 from an application entitled IMAGE SIGNAL PROCESSING SYSTEM WHICH USES A PORTABLE COMPUTER MONITOR AS A DISPLAY earlier filed in the Korean Industrial Property Office on Sep. 20, 1996, and duly assigned Ser. No. 96-41161.

BACKGROUND OF THE INVENTION

1. Technical Field

The present invention relates to an image signal processing device which uses a portable computer monitor as a display, and, more particularly, to an image signal processing system which processes television signals or external image signals and displays the same using a portable computer monitor such as a liquid-crystal display(LCD).

2. Related Art

The prior art in the area of liquid crystal television displays and/or receivers is represented by the following patents: U.S. Pat. No. 4,652,932 to Miyajima et al., entitled Liquid Crystal Display Television Receiver; U.S. Pat. No. 4,809,078 to Yabe et al., entitled Liquid Crystal Television Receiver; U.S. Pat. No. 4,982,275 to Brody, entitled Modular Flat-Screen Color Television Displays And Modules And Circuit Drives Therefor; and U.S. Pat. No. 5,119,204 to Hashimoto et al., entitled Liquid Crystal Television Set Having Driving Circuit On Peripheral Portion And Method Of Fabrication Of Image Display Section. However, for the reasons stated below, the invention disclosed herein has advantages over the prior art, and is thus distinguishable therefrom.

However, such dedicated or single function television displays and/or receivers have had a cost disadvantage in that and pays a relative large price for the single function of television program display.

In the meantime, computers have become increasingly commonplace. More recently, as a result of changing lifestyles and work patterns, there has been a rise in the use of portable computers That is, many people desire and require mobility when using their computers.

In addition, the development of computers has taken a "multimedia" direction in which a single computer has the potential for containing a variety of functions which enable the computer to be used for many different tasks. Through this multimedia development, computers are not limited by location or distance and can handle an assortment of office and leisure-related tasks.

In order to allow the computer to contain all these functions, development in the computer itself is, of course, very important. Equally important and crucial for the performance of some functions, however, are advancements made with regard to the monitor.

Monitors for portable computers now use TFT LCDs and other such displays that offer excellent display quality. It is, therefore, now possible to mount a television reception device inside the portable computer and watch television.

If the user desires television-viewing capabilities, a television reception device must be mounted inside the main body of the portable computer. But the addition of a TV reception device increases the weight of the portable computer. Further, programs used for the viewing of television are complicated and require that many adjustments be made. This is burdensome for the user acquainted with computers and complex for the novice.

As a result, there is a need for a device which allows the user to watch television using a monitor of a portable computer such that the weight of the portable computer is not increased, and the operation of viewing television is simple. Specifically, there is a need for a device which provides the advantages of a single-function, image signal processing device (i.e., simplicity) and which precludes the installation of television receiving circuitry in the portable computer (thereby increasing its weight) while at the same time allowing the use of a portable computer monitor with the image signal processing device, thereby achieving economy and the further advantages associated wide use of a high quality portable computer monitor.

SUMMARY OF THE INVENTION

The present invention has been developed in an effort to fill the above need.

It is an object of the present invention to provide an image signal processing system which is structured so as to enable the use of a portable computer monitor, such that the weight of a portable computer is not increased, and the viewing of television is easy. To achieve the above object, the present invention provides an image signal processing system which uses a display removed from a portable computer. The system includes a housing containing an image signal processing device for receiving, converting and outputting image signal data. The housing is provided with attachment members for physically attaching the display removed from the portable computer to the image signal processing device, and the image signal processing device is provided with means for electrically connecting the device to the display so as to transmit the image signal to the display.

The body is further provided with a battery receptor into which a battery used for portable computers can be inserted.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will now be described in detail with reference to the accompanying drawings.

Figure 1:
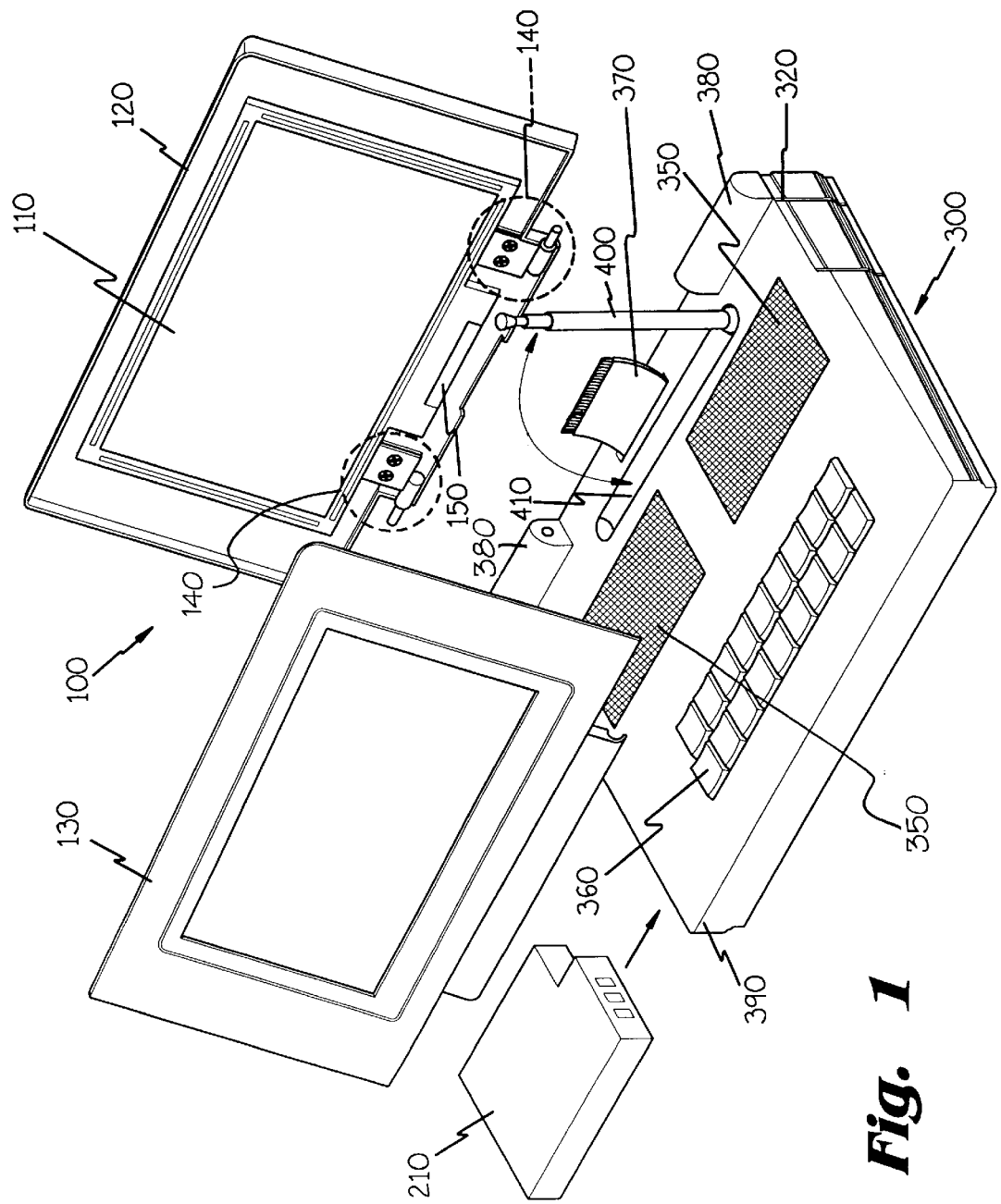
FIG. 1 is an exploded perspective view of an image signal processing system which uses a portable computer monitor according to an embodiment of the present invention.

As shown in FIG. 1, there is shown an image signal processing system 300 which uses a portable computer monitor 100. The image signal processing system 300 includes a television reception device 320 for receiving an input of television signals, for modulating and demodulating the signals, for converting the signals to allow for display, and for outputting the signals; a control portion 360, which allows a user to control the image signal processing system 300; speakers 350 mounted in the image signal processing system 300; an antenna 400 for receiving television signals such that they can be provided to the television reception device 320; an antenna holder 410, into which the antenna 400 can be folded when the image signal processing system is not in use; attachment members 380 to which the monitor 100 is joined; a data cable 370, which transmits data from the television reception device 320 to the monitor 100; and a battery receptor 390.

The monitor 100, used from a portable computer, includes a liquid crystal display(LCD) 110 which displays television data transmitted from the television reception device 320, a connecting portion 150 into which the data cable 370 is inserted to electronically connect the LCD 110 and the television reception device 320, a back case 120 and a front case 130 which cover and protect the LCD 110, and connecting means 140, which mechanically connects the LCD 110 to the image signal processing system 300. Also, a battery 210 from a portable computer is placed in the battery receptor 390 of the image signal processing system 300, the battery 210 supplying electrical power to the image signal processing system 300 and the LCD 110.

Figure 2:
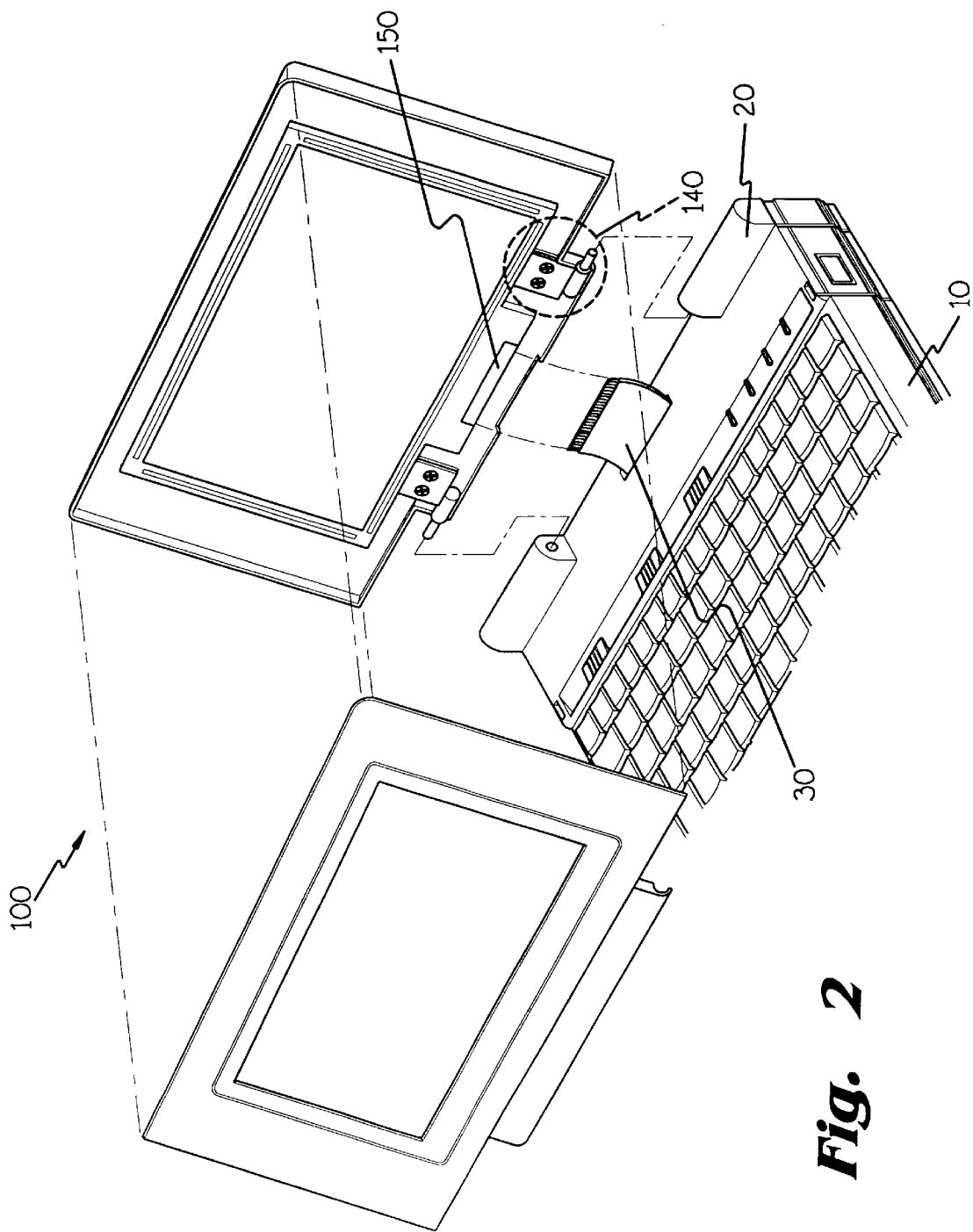
FIG. 2 is an exploded perspective view of the prior art portable computer with detachable monitor.

FIG. 2 illustrates the monitor 100 in a state detached from a conventional portable computer. As shown in the drawing, a main body 10 of the portable computer includes pc attachment members 20 and a pc data cable 30. The connecting members 140 of the monitor 100 are disconnected from the pc attachment members 20, and, at the same time, the pc data cable 30 is disconnected from the connecting portion 150 of the monitor 100. As a result, the monitor 100 can be used in the image signal processing system 300 of the present invention.

Figure 3:
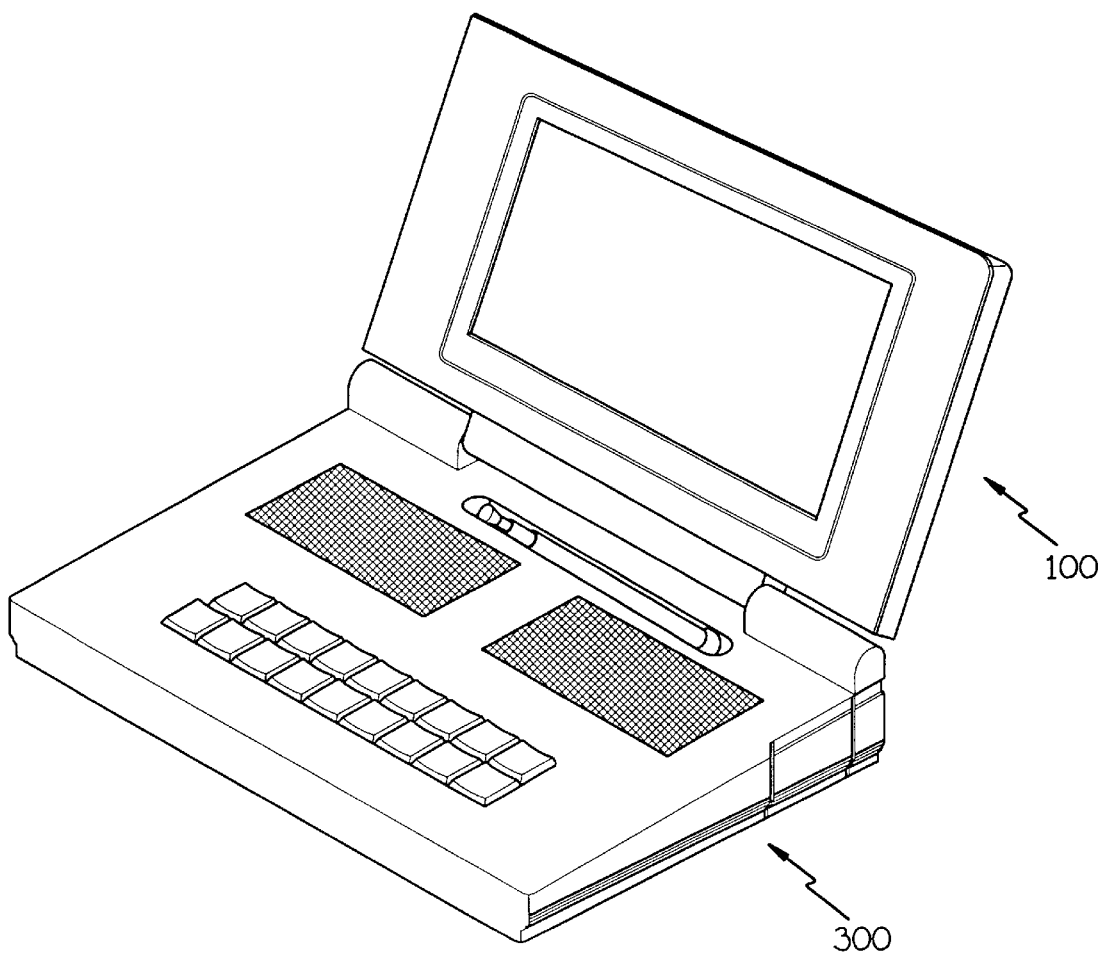
FIG. 3 is a perspective view of an image signal processing system in a state in which the prior art monitor is attached thereon.

FIG. 3 illustrates the image signal processing system 300 and the monitor 100 in an assembled state.

Figure 4:
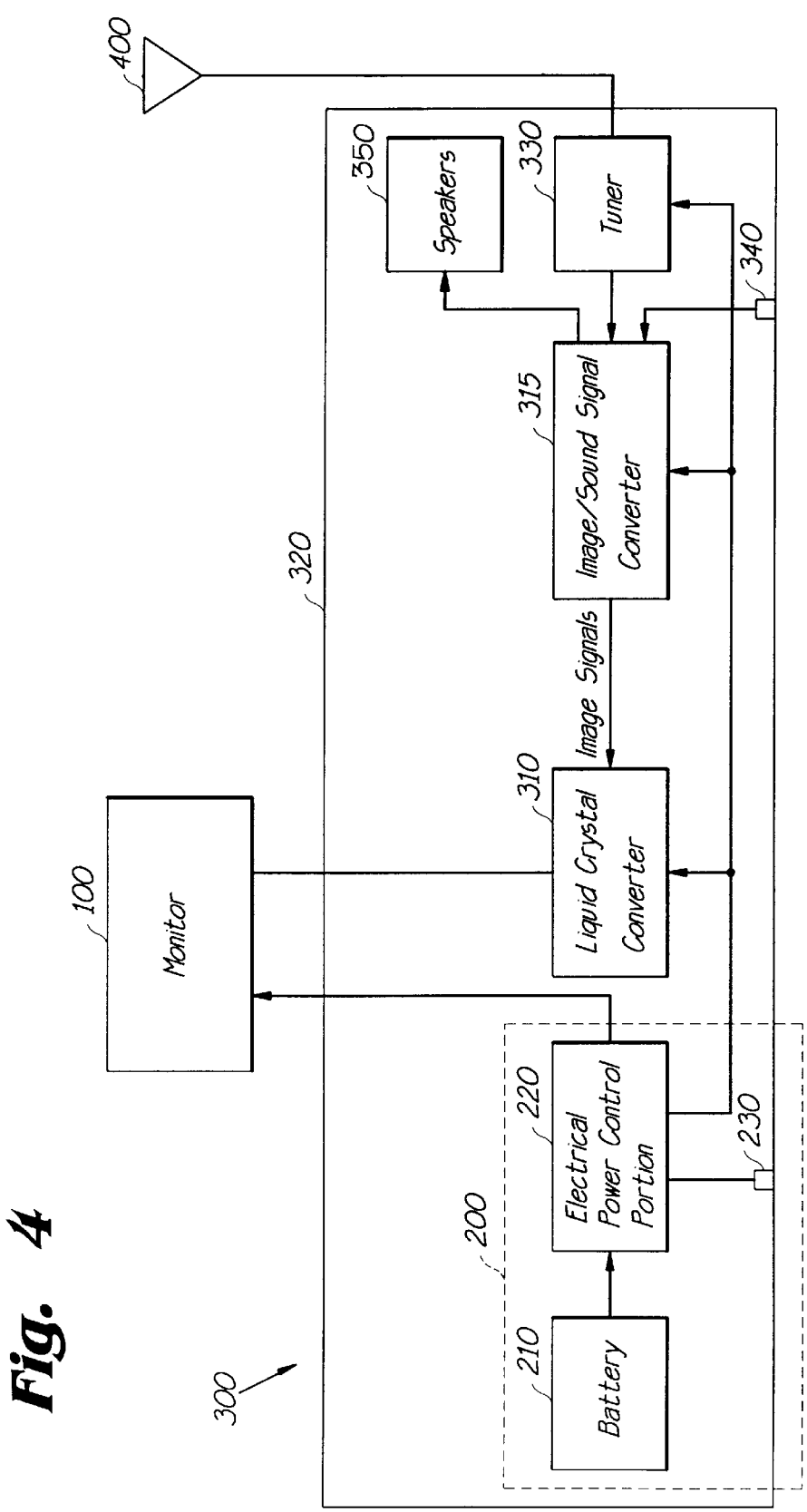
FIG. 4 is a block diagram of the image signal input device according to a preferred embodiment of the present invention.

Referring now to FIG. 4, there is shown a block diagram of the image signal processing system according to a preferred embodiment of the present invention. As shown in the diagram, there is provided an electrical power portion 200, which controls the electricity for all the devices in the image signal processing system 300; a tuner 330, which performs detection and tuning functions relative to television signals inputted from the antenna 400 and outputs the latter signals; an image/sound signal converter 315, which converts the signals outputted from the tuner 330 into image and sound signals; a liquid crystal converter 310, which converts the image signals provided by the image/sound signal converter 315 into liquid crystal display signals that can be provided to the liquid crystal display 110 for display; speakers 350 responsive to the sound signals received from the converter 315 for producing actual sounds; and an external image input terminal 340, which is a conventional terminal for directly receiving image signals from an external reception device, rather than through the tuner 330.

The electrical power portion 200 further comprises: the battery 210; an adaptor connecting jack 230 which interfaces with a conventional adaptor from a portable computer so as to apply electrical power to the image signal processing system 300; and an electrical power control portion 220 which receives external power or power from the battery 210 and controls the power supplied to all the components of the image signal processing system 300.

In the present invention, although a liquid crystal converter 310 is disclosed, it is possible to use other such converters to make the image signal processing system 300 compatible with the portable computer monitor 100.

The following is an explanation of the operation of the image signal processing system 300 according to a preferred embodiment of the present invention.

First, the monitor 100 (FIG. 1) from a portable computer is removed and the connecting members 140 and connecting portion 150 of the monitor 100 are connected to the attachment members 380 and data cable 370, respectively, of the image signal processing system 300. Next, the battery 210 from the portable computer is inserted in the battery receptor 390 or an adaptor is connected to the adaptor connecting jack 230 (FIG. 4).

When electrical power is supplied, the image signal processing system 300 receives television signals through the antenna 400 which provides these signals to the tuner 330 (see FIGS. 1 and 4).

The tuner 330 detects and tunes frequency television signals corresponding to the received television signals, and outputs these signals in correspondence to the system used in the particular district. Namely, the signals are outputted in one of the following methods: NTSC (National Television System Committee), PAL (Phase Alternation by Line), or SECAM (Sequence de Killers Avec Memoire).

The image/sound signal converter 315 receives the above signals and converts them into image signals. These image signals are then inputted to a liquid crystal converter 310 for further conversion into signals that can be used in the LCD 110 of monitor 100.

After these signals are converted in the liquid crystal converter 310, they are outputted to the LCD 110, allowing for the display of images on a screen according to the received television signals Signals can also be received directly by the external image input terminal 340 of FIG. 4, bypassing the tuner 330. After the reception of the signals by the external image input terminal 340, the signals are then transmitted to the image/sound signal converter 315, and then the same process as described above is followed. That is, the signals are received by the image/sound signal converter 315, are converted and outputted as image signals to the liquid crystal converter 310, and are then converted and outputted to the LCD 110 which, in turn, displays the corresponding images on monitor 100.

Figure 5:
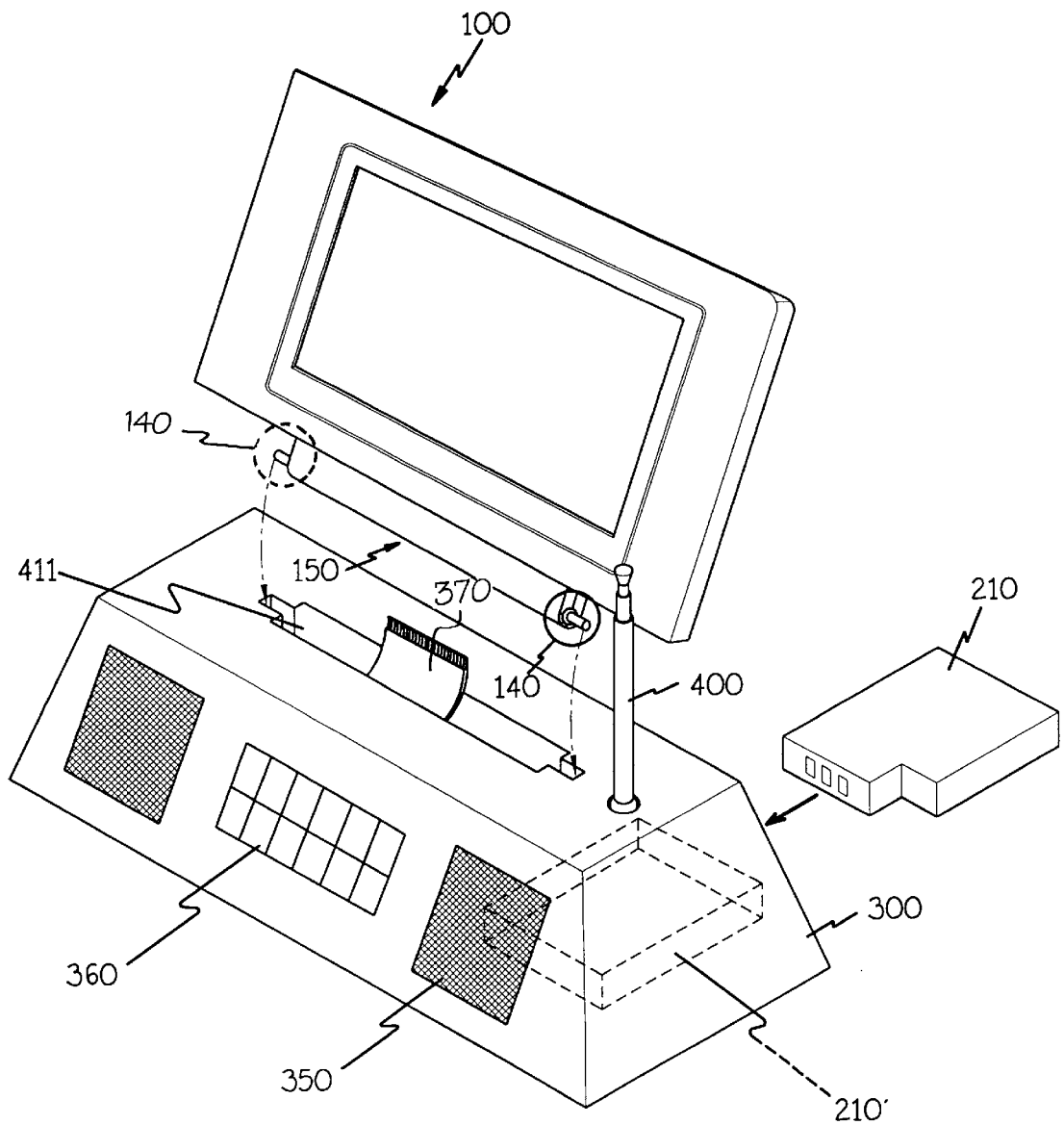
FIG. 5 is an exploded perspective view of an image signal processing system which uses a portable computer monitor according to another embodiment of the present invention.

Referring to FIG. 5, in the system, the speaker 350 and the control portion 360 can be mounted on the front side of the system 300. On the upper side of the system, a display mounting groove 411 is formed such that the display 100 can be pivotally mounted.

By using the image signal processing system of the present invention, a portable computer monitor can be used as the screen such that a television reception device need not be installed in the portable computer. Thus, an increase in the weight of the computer is avoided, and the watching of television is made easy by eliminating the need to run complicated computer programs.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. An image signal processing system, comprising:
   a base which is adapted to receive, and to be mechanically and electrically connected to, a portable computer display unit which is detached from a portable computer and detachably connected to said image signal processing system so as to serve as a visual display of said image signal processing system;

a controller for driving said portable computer display unit to visually exhibit variable visual images, said portable computer display unit having a data connector to receive from said controller image signals defining said visual images, and having a side bearing at least two components defining a hinge enabling said portable computer display unit to rotate while said at least two components are mated with said base, said portable computer display unit being rotatable between an opened and erect position rising transversely from said base and exposing said visual images, and a closed position covering keyboard borne by the base;

at least two connectors disposed on a side of said base for matingly receiving and engaging said at least two components while maintaining said portable computer display unit in said erect position;

image signal processing means disposed within said base for receiving and converting image signals to provide image signal data as an output to said portable computer display unit;

connecting means disposed on said base for receiving said data connector, for electrically connecting said image signal processing means to the portable computer display unit, and for transmitting the image signal data from the image signal processing means to the portable computer display unit;

antenna means mounted on said base for receiving external signals;

receiver means disposed within said base and coupled to said antenna means for receiving said external signals received by said antenna means; and receiving means disposed in said base and comprising at least one external input terminal for directly receiving additional external signals;

wherein said base further comprises a battery receptor into which a battery is inserted for portable operation of said image signal processing system.

2. The image signal processing system of claim 1, further comprising:

tuner means for performing detection and tuning functions relative to the external signals received by said antenna means, for creating image and sound signals, and for providing said image and sound signals as an output.

3. The image signal processing system of claim 2, wherein said antenna means comprises an antenna and said base is further provided with an antenna groove into which said antenna is folded when the image signal processing system is not in use.

4. The image signal processing system of claim 1, wherein said at least two components comprise a pair of oppositely deployed pin-type connectors disposed on a side of said portable computer display unit, and said at least two connectors comprise a pair of pin-receiving connectors disposed on the side of said base.

5. The image signal processing system of claim 4, wherein said data connector is centrally located between said pair of oppositely deployed pin-type connectors on the side of said portable computer display unit, and said connecting means is centrally disposed between said pair of pin-receiving connectors on the side of said base.

6. The image signal processing system of claim 1, wherein said data connector is centrally located on the side of said portable computer display unit, and said connecting means is centrally disposed on the side of said base.

7. An image signal processing system which uses a portable computer display unit as a display, said system comprising:

a housing;

mounting means for mounting said display unit on said housing;

an antenna;

receiver means coupled to said antenna for receiving external signals via said antenna;

receiving means comprising at least one external input terminal for receiving additional external signals;

converter means for converting said external signals into image signals and sound signals;

further means for providing said image signals to said display unit for display; and speaker means for receiving and responding to said sound signals so as to produce audible sound;

wherein said housing is adapted to receive, and to be mechanically and electrically connected to, the portable computer display unit when the portable computer display unit is detached from a portable computer and detachably connected to said image signal processing system so as to serve as the display of said image signal processing system;

said housing including at least two connectors disposed on a side of said housing for matingly receiving and engaging at least two components on said portable computer display unit.

8. The system of claim 7, wherein said housing is further provided with an antenna groove into which said antenna is folded when the image signal processing system is not in use.

9. The system of claim 8, wherein said converter means comprises an image/sound signal converter.

10. The system of claim 7, wherein said portable computer display unit comprises a liquid crystal display unit, and said further means comprises a liquid crystal converter for converting said image signals into liquid crystal display driving signals for provision to said liquid crystal display unit.

11. The system of claim 7, wherein said converter means comprises an image/sound signal converter.

12. The system of claim 7, wherein said at least two components comprise a pair of oppositely deployed pin-type connectors disposed on a side of said portable computer display unit, and said at least two connectors comprise a pair of pin-receiving connectors disposed on the side of said housing.

13. The system of claim 12, wherein said portable computer display unit comprises a data connector which is centrally located between said pair of oppositely deployed pin-type connectors on the side of said portable computer display unit, and said further means comprises a further data connector which is centrally disposed between said pair of pin-receiving connectors on the side of said housing.

14. The system of claim 7, wherein said portable computer display unit comprises a data connector which is centrally located on the side of said portable computer display unit, and said further means comprises a further data connector which is centrally disposed on the side of said housing.

* * * * *